Patented Aug. 5, 1947

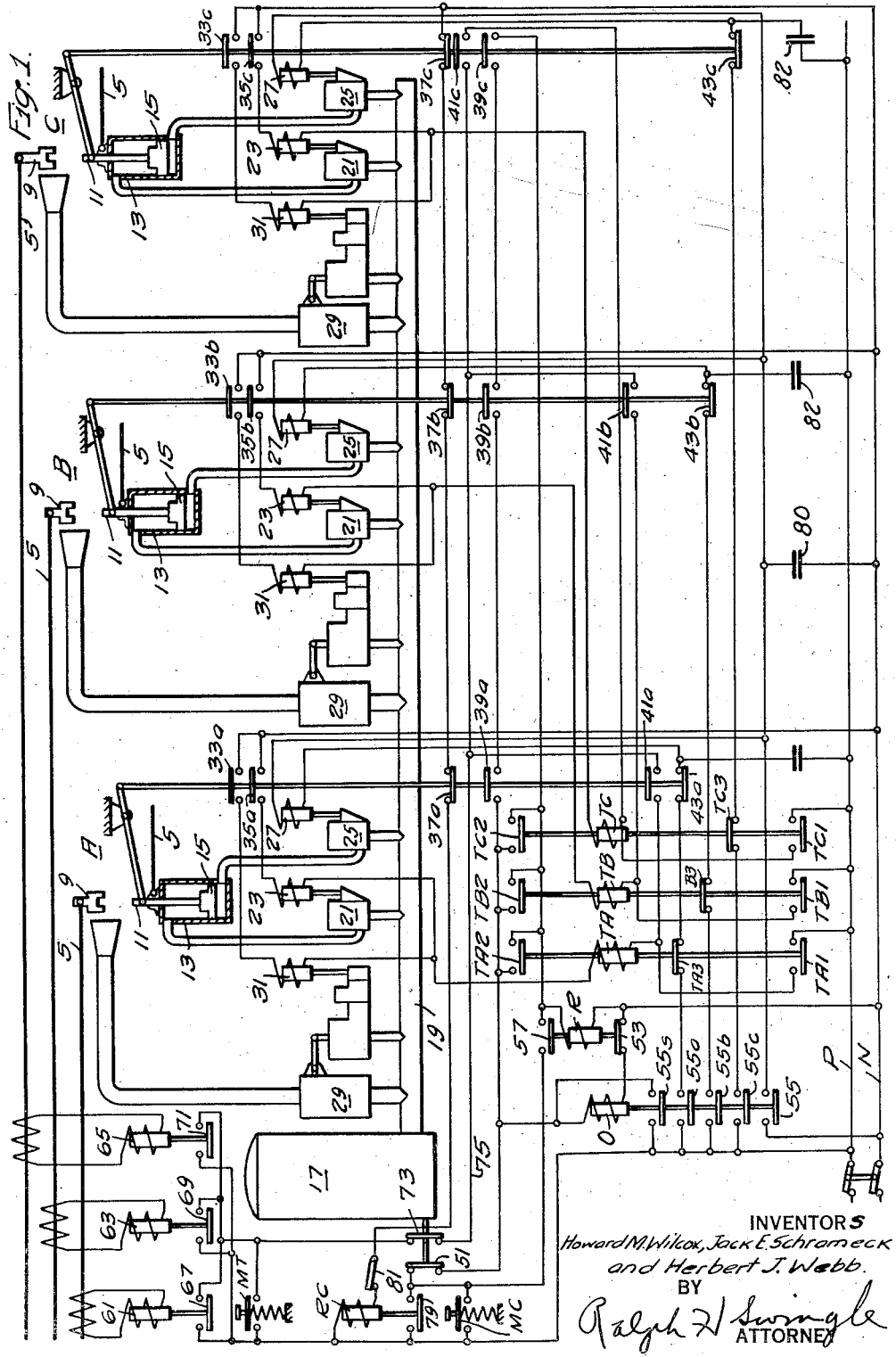

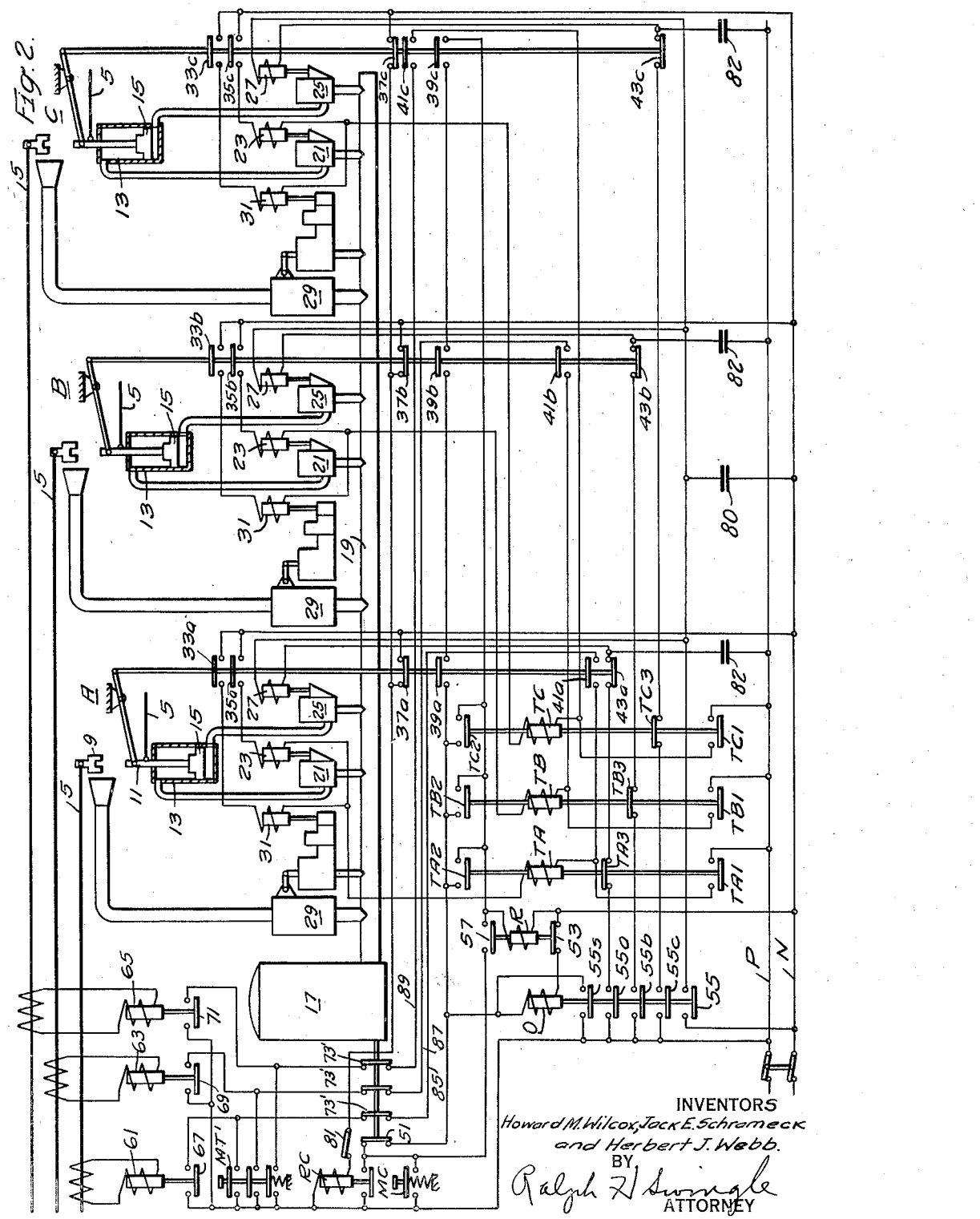

2,425,168

UNITED STATES PATENT OFFICE 2,425,168

AUTOMATIC AND MANUAL RECLOSING CONTROL CIRCUITS FOR POLYPHASE SINGLE POLE CIRCUIT BREAKERS

Howard M. Wilcox and Jack E. Schrameck, Wilkinsburg, and Herbert J. Webb, Forest Hills, Pa., assignors to Westinghouse Electric Corporation, East Pittsburgh, Pa., a corporation of Pennsylvania Application August 6, 1943, Serial No. 497,584

26 Claims. (Cl. 175—294)

The invention relates to circuit breakers for controlling and protecting multiphase high-voltage electrical power transmission systems or networks, and more particularly to the operating and control system of such circuit breakers.

It has been customary heretofore in multipole circuit breakers to have the several phase circuit breaker units, or pole units as they are called, mechanically tied together for tripping and closing in unison by a single operating mechanism.

We have found it desirable, however, to provide a multipole high-voltage circuit breaker, preferably of the compressed gas-operated gas-blast type, having mechanically independent phase circuit breaker units or pole units, each with its own individual operating mechanism and control devices without any mechanical tie between the units or their operating means, and to provide an electrical control system for controlling and synchronizing the operation of the several phase circuit breaker units. This improved arrangement materially simplifies the structure and provides safe electrical isolation between the phase circuit breaker units in a very simple and economical manner. It also provides flexibility of control so that the multiphase unison switching system, where all of the phase circuit breaker units are tripped in unison upon the occurrence of a fault in any phase, can very easily be changed to provide for single-phase switching where only the phase circuit breaker unit of the phase on which there is a phase-to-ground fault is initially tripped open and reclosed. This change of system can be made by a very simple and minor change in the control system. We have also found it desirable to provide each pole unit of the compressed-gas high-voltage circuit breaker with a blast valve separate from the tripping or opening valve of the pole unit and to deenergize or close the blast valves prior to closing of opening valves during opening operation of the breaker in order to conserve pressure gas. The blast valves can be closed immediately after the current arcs have been extinguished which occurs considerably before moving contact means has reached the full open position.

An object of the invention is the provision of a multipole high-voltage circuit breaker having mechanically independent circuit breaker units or pole units, each with an individual operating mechanism, and a control system for controlling and synchronizing the operation of the several units.

Another object of the invention is the provision of a multipole compressed gas circuit breaker having mechanically independent pole units, each with its individual operating means, and a control system for the several units arranged so that during a closing operation the closing means will not be deenergized, under normal conditions, until the contact means of all of the pole units have closed in.

Another object of the invention is the provision of a multipole compressed gas circuit breaker having mechanically independent current interrupting contacts, each with its individual operating means, and a control system for the several units arranged so that during a tripping or opening operation the tripping means will not be deenergized until the last pole unit to operate has opened a predetermined distance.

Another object of the invention is the provision of a multipole compressed gas circuit breaker having mechanically independent pole units, each with its individual operating means, and a control system for the several units arranged so that, in case of a tripping operation followed immediately by a closing operation, the closing means will not be energized until the contact means of all of the pole units have opened a predetermined distance.

Another object of the invention is the provision of a multipole compressed gas circuit breaker having mechanically independent sets of circuit interrupting contacts, each with an individual operating means, and a control system for the several units arranged so that a tripping operation will always take preference over a closing operation if any of the current interrupting contacts close against a faulted line.

Another object of the invention is the provision of a multipole compressed gas circuit breaker having mechanically independent sets of current interrupting contacts, each with its individual operating means, and a control system for the several pole units arranged so that if any pair of current interrupting contacts is being closed against a faulted line, the closing means will be immediately deenergized and the breaker immediately tripped open.

Another object of the invention is the provision of a multipole compressed gas circuit breaker having mechanically independent sets of current interrupting contacts, each with an individual operating means, and a control system for the several units having means for preventing the initiation of an operation when the pressure of the operating gas is below a predetermined value, but which will not interfere with an operation once initiated even though the gas pressure has dropped below the predetermined value.

Another object of the invention is the provision of a multipole compressed gas circuit breaker having mechanically independent sets of current interrupting contacts, each with an individual operating means, and a control system for the several units arranged so that an operation of the circuit breaker once initiated is carried out independently of the length of time that the control switch or contact which initiated the operation is held closed.

Another object of the invention is the provision of a multipole compressed gas circuit breaker having mechanically independent sets of current interrupting contacts for each pole, each with an individual operating means, and a control system for the several units arranged so that if the control switch or contacts are held closed longer than is necessary to allow the breaker to perform the operation, the operating means will be automatically deenergized upon completion of the operation, and pumping of the breaker is prevented.

Another object of the invention in accordance with a modification thereof is the provision of a multipole compressed gas circuit breaker having mechanically independent sets of current interrupting contacts, each with an individual operating means, and a control system for the several units arranged to effect single pole tripping and reclosing of at least the current interrupting contacts of any phase on which a phase-to-ground fault occurs. This modification also embodies a number of the features set forth in the preceding objects.

For a fuller understanding of the nature and objects of the invention, reference may be had to the following detailed description taken in conjunction with the accompanying drawings, in which:

Figure 1 is a diagrammatic view of a multipole high-voltage circuit breaker and an operating and control system therefor embodying the invention, the system illustrated being arranged to effect unison switching operation of the several phase circuit breaker units; and Fig. 2 is a similar diagrammatic view illustrating a modification of the invention wherein the control system is arranged to at times effect single pole operation of the circuit breaker.

Referring to Fig. 1 of the drawing, the heavy lines 5 represent the conductors of a high-voltage multi-phase power transmission line or system which is connected at one end to a high-voltage power supply bus or line (not shown). The three phase-conductors of the transmission line or system are controlled and protected by a high-voltage multi-pole circuit breaker shown schematically in the drawing.

The circuit breaker comprises a plurality of mechanically independent circuit interrupting pole units A, B, and C, one being provided for each of the line conductors and connected in series therein. These circuit breaker units are preferably of the compressed gas-operated, gas-blast type wherein the contacts are operated by compressed gas and the arc drawn upon interruption of the circuit is extinguished by a blast of compressed gas directed thereto.

The construction of the several circuit breaker units may be similar to the circuit breaker unit disclosed in the copending application of L. R. Ludwig et al., Serial No. 437,010, filed March 31, 1942, now Patent No. 2,342,809, issued February 29, 1944, or similar to the circuit breaker units disclosed in the copending application of L. R. Ludwig et al., Serial No. 431,394, filed February 18, 1942, now Patent No. 2,394,086, issued February 5, 1946, both of said applications being assigned to the assignee of the present invention. It is to be understood, of course, that the circuit breaker units A, B, and C may be of other suitable and desired construction.

The three circuit breaker pole units A, B, and C which are shown schematically, are of identical construction and are mounted in spaced relation on high-voltage insulators (not shown). Each unit comprises stationary contact means 9, cooperating movable contact means 11, and an individual operating means of the pneumatic type comprising a cylinder 13 and a piston 15 therein for actuating the movable contact means 11 to open and to closed circuit position. The opposite ends of the cylinder 13 are connected by pipes to a source of gas under pressure comprising a tank 17 in which a suitable gas, such as air, is stored and maintained at a predetermined high pressure by a motor driven compressor unit (not shown). The tank 17 serves as the source of pressure gas supply for all of the circuit breaker units, being connected to the several units by a common manifold 19.

Each circuit breaker pole unit is provided with an opening or tripping valve 21, controlled by an electromagnet 23, for admitting gas under pressure to the upper end of the cylinder 13 to effect circuit opening operation of the contacts, and with a closing valve 25, controlled by an electromagnet 27 for admitting gas under pressure to the lower end of the cylinder to effect circuit closing operation of the contacts. A blast valve 29, controlled by an electromagnet 31, is also provided for directing a blast of gas under pressure to the contacts during the initial portion of the circuit opening operation of the contacts to extinguish the arc drawn by the movable contact means. Each unit is also provided with auxiliary switch means, of conventional type, comprising a plurality of individually adjustable sets of contacts 33, 35, 37, 39, 41, and 43, the small letters a, b, or c added to these numerals identifying the circuit breaker unit with which the auxiliary switch contacts are associated. These auxiliary contacts are operated in accordance with the movement and position of movable contact means or operating means of the circuit breaker unit.

Some features of the invention however are applicable to a multipole circuit breaker where each pole unit has an individual operating means for the current interrupting contacts and these contacts and the individual operating means are mechanically independent, but the disconnecting switches in series with the current interrupting contacts are arranged for gang operation.

We have found it desirable to have the circuit breaker pole units mechanically independent of one another, i. e., without any mechanical tie between the units, regardless of whether the units have only a single moving contact or an additional set of disconnecting contacts. This materially simplifies the electrical isolation problem between units and also provides for flexibility of control.

In accordance with the invention, an improved control system is provided for controlling operation of the mechanically independent circuit breaker units, characterized by the provision of independently controllable energizing circuits for the valve devices of the several units. For unison switching operation of the several units, the control system is as shown in Fig. 1. Control energy for operating the valve electromagnets is supplied by positive and negative supply lines P and N which are connected to a direct-current source of supply. Closing operation of the breaker units A, B, and C is initiated by closing a manual closing control switch MC. Closing of this switch completes an energizing circuit for the single closing relay O from the positive supply line P through a pressure responsive switch 51, coil of closing relay O and back contacts 53 of a release relay R to the negative supply line N. As soon as the closing relay O picks up, it closes its contacts 55, 55a, 55b, and 55c to simultaneously close separate energizing circuits for the closing valve electromagnets 27 of all of the circuit breaker units A, B, and C.

The energizing circuit for the closing valve electromagnet 27 of circuit breaker pole unit A extends from the positive supply line P through contacts 55a of closing relay O, auxiliary contacts 43a which are closed when the circuit breaker unit is open, through the coil of electromagnet 27 of the unit A and through contacts 55 of the closing relay to the negative supply line N. The energizing circuit for the closing valve electromagnet 27 of the unit B extends from the positive supply line P through the contacts 55b and auxiliary switch 43b, electromagnet 27 of unit B, and through contacts 55 to the negative supply line N. The energizing circuit for the closing valve electromagnet 27 of circuit breaker unit C is from the supply line P through the contacts 55c and 43c, electromagnet 27 of unit C, and back through the contacts 55 to the negative supply line N. Energization of the three closing valve electromagnets cause the closing valves 25 to open and admit compressed gas to the fluid motors 13—15 of the three circuit breaker units to effect substantially simultaneous closing operation of the contacts of the three circuit breaker units.

The pressure responsive switch 51 is responsive to the pressure of the gas within the supply tank 17 and is arranged to open its contacts when the pressure of the gas in the tank 17 drops below a predetermined safe operating value. The purpose of this pressure responsive switch is to prevent the initiation of a closing operation of the circuit breaker at any time when the gas pressure in the tank 17 is below a predetermined value which would make it unsafe to start a circuit closing operation of the breaker.

The closing relay O when energized to effect a circuit closing operation of the breaker also closes a make contact 55s which is utilized as a holding contact to maintain the closing relay energized independently of the position of the manual control switch and also independently of the position of the pressure responsive switch 51, until the closing operation of the circuit breaker has been completed. The holding circuit for the closing relay extends from the positive supply line P through the holding contacts 55s, the coil of closing relay O, and back contacts 53 of the release relay R to the negative supply line N. The provision of this holding contact and holding circuit makes the closing operation independent of the length of time that the manual control switch is held in closed position and also insures that the pressure switch 51 cannot deenergize the closing circuit during an operation after it has been initiated. Otherwise, the breaker contacts might stall in an intermediate position.

The release relay R serves to automatically deenergize the closing relay O upon completion of the circuit closing operation of the circuit breaker. Since the several circuit breaker units are mechanically independent and have individual operating means, the contacts of these units may not close at exactly the same moment. It is, therefore, important in the unison switching system shown in Fig. 1 that the closing relay O should not be deenergized until the last breaker unit to operate has closed in. For this purpose, the energizing circuit of the release relay R has included in series therein the three sets of auxiliary contacts 39a, 39b, and 39c, each pair of which is arranged to close when the contacts of its corresponding circuit breaker unit reach closed position. Since the three sets of auxiliary contacts are connected in series, the energizing circuit for the release relay R is not completed, until the contacts of all the circuit breaker units A, B, and C have closed. This energizing circuit for the relay R extends from the positive conductor P through the seal-in contacts 55s of the relay O, through the three pairs of auxiliary contacts 39a, 39b, and 39c, and coil of release relay R to the negative supply line N. It will, therefore, be seen that as soon as the contacts of all of the circuit breaker pole units have reached closed position, the release relay R will be energized and will open its back contacts 53, thereby deenergizing the closing relay O. At the same time, the relay R picks up its make contacts 57 to connect the coil of this relay to the manual closing control switch MC. Consequently, once the relay R has been picked up, it will remain energized if the manual closing control switch is held closed longer than is necessary to complete the closing operation of the circuit breaker. This prevents pumping of the circuit breaker pole units i. e. repeated opening and reclosing operation of the units, if the control switch is held closed and the circuit breaker units reopen as in the case of closing in against a faulted circuit.

Each set of auxiliary contacts 43a, 43b, and 43c is arranged to open when the contacts of its corresponding circuit breaker unit reach closed position, thereby automatically deenergizing the separate energizing circuit of the closing valve electromagnet of its corresponding circuit breaker unit. Thus, each closing valve electromagnet 27 is automatically deenergized as soon as the contacts of the corresponding circuit breaker reach closed position. The closing relay O, however, remains energized until the last circuit breaker unit to operate has closed in.

Opening operation of the circuit breaker units A, B, and C is initiated by the operation of fault responsive relays 61, 63, and 65, one being provided for each of the separate conductors 5 of the transmission line or system. Each fault relay is adapted to be operated in response to predetermined fault conditions such as an overload or a short circuit on the corresponding one of the conductors of the transmission line 5, each relay being energized in response to the current of the corresponding main line conductor by means of a suitable current transformer. The contacts 67, 69, and 71 of the three fault responsive relays are electrically connected in shunt relation to one another in the circuit which initiates opening operation of the three circuit breaker units so that operation of any one of the fault responsive relays in response to predetermined fault conditions on the corresponding main line conductor 5 will initiate opening operation of all three of the circuit breaker units together. The blast valve electromagnet and the opening valve electromagnet of each circuit breaker unit are connected in parallel branch circuits and in series with an opening relay shown at TA for the breaker unit A, TB for the breaker unit B, and TC for the breaker unit C. It will be noted that a separate circuit is provided for each circuit breaker unit for energizing the opening relay and the blast and opening valve electromagnets of the unit. In the Fig. 1 embodiment, the three separate energizing circuits are simultaneously closed by the operation of any one of the fault responsive relays. Upon operation of any one of the fault responsive relays, a circuit is established from the positive supply line P, through the contact of the fault relay and a pressure responsive switch 73, to a conductor 75. A branch from the common conductor 75 for the circuit breaker unit A extends through the auxiliary switch contacts 41a, which are in closed position when the breaker unit A is closed, opening relay TA, through the parallel circuits including the blast valve electromagnet 31 and the opening valve electromagnet 23 and the closed auxiliary switch contacts 33a and 35a in series respectively with these electromagnets, to the negative supply line N. Another branch circuit from the common conductor 75 for breaker unit B extends through the closed auxiliary switch contacts 41b, opening relay TB, through the parallel circuits including the blast valve electromagnet and opening valve electromagnet of unit B and the closed auxiliary switch contacts 33b and 35b in series respectively therewith, to the negative line N. A third branch circuit for the breaker unit C extends from the common conductor 75 through the closed auxiliary switch contacts 41c, opening relay TC, through the parallel circuits including the blast valve electromagnet 31 and opening valve electromagnet 23 of unit C and the closed auxiliary switch contacts 33c and 35c in series respectively with these electromagnets, to the negative line N. Thus, operation of any one of the fault relays simultaneously energizes the opening relays, the blast valve electromagnets, and the opening valve electromagnets of all three circuit breaker units A, B, and C over separate branch energizing circuits for the units. The three blast valves 29 and the three opening valves are thus opened simultaneously to cause circuit opening operation of the three circuit breaker units A, B, and C.

The pressure responsive switch 73 connected in series in the conductor 75 is responsive to the gas pressure within the tank 17, and is arranged to open its contacts whenever the gas pressure within the tank 17 drops below a predetermined value which would make it unsafe to initiate an opening operation of the circuit breaker units. Since this switch is in series in the common conductor 75, it will function to prevent initiation of a circuit opening operation at any time when the pressure of the gas within the tank 17 is below the predetermined safe value.

The opening relays TA, TB, and TC are provided, respectively, with front contacts TA1, TA2, TB1, TB2, TC1, TC2, and with back contacts TA3, TB3, and TC3. Immediately upon energization of the three opening relays, the front contacts TA1, TB1, and TC1 connect the positive sides of the opening relays directly to the positive supply line P, bypassing the fault relay contacts and also bypassing the pressure responsive switch 73, thereby establishing holding circuits for maintaining the opening relays and the blast and opening valve magnets of the three circuit breaker units energized independently of the contacts of the fault relay and the pressure responsive switch. This renders the pressure responsive switch 73 ineffective for the duration of the circuit opening operation.

The auxiliary switch contacts 33a, 33b, and 33c in series respectively in the branch circuits of the three blast valve electromagnets 31 are arranged to open at a predetermined intermediate point in the opening operation of the moving contacts 11 of the three circuit breaker units after the current arcs have been extinguished in order to permit the three blast valves to close. The three sets of auxiliary switch contacts 35a, 35b, and 35c which are in series, respectively, with the opening valve electromagnets 23 of the circuit breaker units are arranged to open at or near the end of the opening stroke of the movable contact means of their respective circuit breaker units in order to automatically deenergize these electromagnets and allow the opening valves to close upon completion of the tripping operation. As soon as each auxiliary switch contact 35a, 35b, or 35c opens, it deenergizes the opening relay of the corresponding breaker unit.

Opening operation of the circuit breaker units may also be initiated by means of a manual trip control switch MT. This control switch is connected in shunt relation to the contacts of the fault responsive relays in the circuit for initiating tripping operation of the circuit breaker units. Upon closing of the trip control switch MT, circuit opening operation of the three breaker units A, B, and C will be simultaneously initiated and carried out in the previously described manner the same as when one of the fault responsive relays operates.

Automatic reclosing operation of the circuit breaker is initiated by means of a reclosing relay RC. This relay is adapted to be energized automatically immediately after the moving contact means of the three circuit-breaker units A, B, and C have reached open position. The energizing circuit for this relay is automatically closed upon closing of the three auxiliary switch contacts 37a, 37b, and 37c which are arranged in series in the energizing circuit for the coil of the reclosing relay. Each of the auxiliary switch contacts 37a, 37b, and 37c is arranged to close when the moving contact means of its corresponding pole unit reach open position. All three of these auxiliary switch contacts must be closed before the reclosing relay is energized since they are connected in series. If very quick reclosing is desired, the auxiliary switch contacts 37a, 37b, and 37c may be set to close at a predetermined point in the opening stroke of the circuit-breaker unit after the arc has been established and before the moving contacts of the breaker units have reached the full open position. As soon as all of the auxiliary switch contacts 37a, 37b, and 37c have closed upon completion of the circuit opening operation of the three circuit-breaker units an energizing circuit is completed for the reclosing relay. This circuit extends from the positive line P through the coil of the reclosing relay RC and the three auxiliary switch contacts 37a, 37b, and 37c in series to the negative line N. The contacts 79 of the reclosing relay RC are connected in shunt relation to the manual closing control switch MC. Consequently, when the reclosing relay picks up, the contacts 79 thereof close the energizing circuit for the closing relay O to cause closing operation of the three circuit breaker units A, B, and C in the same manner as previously described for the closing operation initiated by the control switch MC. A manually operable switch 81 is provided in series with the coil of the relay RC to render the reclosing relay inoperative if automatic reclosing is not desired. A conventional lockout device (not shown) may also be provided in series with the reclosing relay for causing this relay to be disconnected and rendered ineffective after a predetermined number of reclosing operations when the circuit breaker fails to remain closed because of a permanent fault condition on the transmission line.

The function of the contacts TA2, TB2, and TC2, of the opening relays TA, TB, and TC, is to positively prevent the initiation of a closing or reclosing operation until the moving contacts of all three of the circuit breaker units have reached the desired open position. The contacts TA2, TB2, and TC2 are connected in shunt relation with one another and also in shunt across the series connected auxiliary switch contacts 39a, 39b, and 39c in the energizing circuit for the release relay R. The closing relay O cannot be energized to effect closing or reclosing operation of the three circuit breaker units until the last circuit breaker unit to operate has reached the open position because each of the opening relays remains energized until the contacts of its corresponding pole unit have reached open position, and as long as any one of these relays is in energized condition, the contacts TA2, TB2, or TC2 thereof complete the energizing circuit for the release relay R causing the release relay to open the energizing circuit of the closing relay.

It will thus be seen that in the case of a tripping or opening operation immediately followed by a reclosing operation, the closing circuits cannot be connected until all three of the circuit breaker units have reached the open position.

In case the predetermined fault condition is present on any one of the conductors of the transmission line 5 at the time the circuit breaker units are being closed or automatically reclosed, the circuit breaker units should be tripped open immediately, and the opening operation should always take preference over the closing operation. That is, the circuit breaker units should be trip free. This is accomplished and insured by the back contacts TA3, TB3, and TC3 of the opening relays. The back contacts TA3 of the opening relay of the unit A are connected in series in the energizing circuit for the closing valve electromagnet 27 of unit A, and the back contacts TB3 and TC3 of the opening relays for the units B and C are connected in series, respectively, with the closing valve electromagnets 27 of these circuit-breaker units. Consequently, when the moving contact means of any one of the breaker units A, B, or C is being closed or automatically reclosed against a faulted line, the circuit-breaker unit will be immediately tripped open as soon as the contacts of the breaker unit strike an arc or touch as they approach closed position. When the main circuit is completed, either by striking of the arc or touching of the contacts, the fault responsive relay associated with that conductor will immediately operate and effect energization of the opening relay of the corresponding circuit breaker unit. Operation of the opening relay opens its back contacts and thereby immediately deenergizes the closing valve electromagnet of the circuit-breaker unit, causing the closing valve to close. In the meantime, the opening valve opens and causes the circuit-breaker unit to trip open. The contacts TA2, TB2, and TC2 of the three opening relays also insure trip-free operation of the circuit-breaker units since when any one of the opening relays is energized when the contacts of the corresponding pole unit are closed or reclosed against a faulted line, the front contacts TA2, TB2, or TC2 which are in shunt relation with one another complete the energizing circuit for the release relay, thereby immediately cutting off or deenergizing the closing relay O.

The condensers 80 and 82 which are shunted across the contacts 55 and 43a, 43b and 43c, respectively, are provided for easing the interrupting duty on these contacts.

Briefly reviewing the important features of the circuit-breaker system, it will be noted that the circuit-breaker pole units, or at least the current interrupting contacts and their individual operating means, of the breaker are mechanically independent of one another; that is, there is no mechanical tie between them. Separate energizing circuits are provided for the closing means and also for the opening means of the several units. The pressure responsive switch 51 is arranged to prevent initiation of a closing or reclosing operation of the circuit breaker units at any time when the pressure of the gas in the tank 17 is below a predetermined safe value. However, once a closing or reclosing operation is initiated, the closing relay seals itself in and maintains the closing valve electromagnets energized independently of the pressure responsive switch 51 and also independently of the control switch contacts or the reclosing relay contacts. Thus, the pressure responsive switch is rendered ineffective after the closing or reclosing operation has been initiated, and the operation of the units is carried out independently of the length of time that the control switch MC or the reclosing relay contacts are closed. The contacts 57 of the release relay connect the release relay coil to the contacts of the manual control switch MC to prevent pumping of the breaker in the event that the control switch is held closed and the circuit breaker units fail to remain in closed position as when they close in against a faulted line. The closing relay O normally is not deenergized until the last circuit-breaker unit to operate has closed in. This is due to the provision of the three auxiliary contacts 39a, 39b, and 39c in series in the energizing circuit for the release relay. Consequently, the release relay normally is not energized to cut off the closing relay until all three of these auxiliary switch contacts have closed, which does not occur until all of the circuit-breaker units have closed in. Each closing valve electromagnet 27, however, is automatically deenergized as soon as the contacts of the corresponding circuit breaker have reached closed position due to opening of the auxiliary switch contacts 43a, 43b, or 43c, which are arranged to open, respectively, when the contacts of the corresponding pole unit reach closed position. The pressure responsive switch 73 prevents initiation of a tripping or circuit opening operation at any time when the pressure of the gas within the tank 17 is below a predetermined value. However, once a tripping operation is initiated, the pressure responsive switch 73 is rendered ineffective for the duration of the tripping operation by the operation of the opening relays TA, TB, and TC. Each of these opening relays when energized seals itself in and maintains the blast valve electromagnet and opening valve electromagnet of the corresponding pole unit energized independently of the fault responsive relay contacts or the manual trip control switch and also independently of the pressure switch 73 until the tripping operation of the unit has been completed. The opening valve electromagnet of each pole remains energized until the contacts of the pole unit reach open position, at which time the auxiliary switch contacts in series with the opening valve electromagnet open up and automatically deenergize this electromagnet and the corresponding opening relay. The closing or reclosing operation cannot be initiated until the last circuit breaker unit to operate has reached the open position, because each individual opening relay remains energized until the opening of the corresponding pole unit has been completed and as long as any one of the opening relays is in energized condition, it completes the circuit for the release relay, thereby disconnecting the closing relay. The circuit-breaker units are made trip-free so that they will immediately trip open if closed or reclosed against a faulted line by reason of the fact that each opening relay when energized in response to operation of any one of the fault relays opens the energizing circuit of the closing valve electromagnet and also energizes the release relay to cut off the closing relay.

In the modification of the invention shown in Fig. 2, the control system for the units of the circuit breaker is arranged for single pole tripping and reclosing so that upon the occurrence of a line-to-ground fault on any one of the separate conductors of the transmission line 5, only the circuit-breaker unit associated with the faulted conductor is tripped open and automatically reclosed. The separate circuit-breaker units and the various control relays are the same as in the original embodiment shown in Fig. 1 and described in connection therewith, and the corresponding elements have been indicated by the same reference characters. The control system for the units is slightly modified, however, for the purpose of obtaining single pole switching operation. For this purpose, the contacts of the fault responsive relays 61, 63 and 65 are connected in separate circuits for individually initiating tripping operation of the corresponding circuit-breaker units, so that when a phase-to-ground fault occurs on any one of the separate conductors of the transmission line 5, the operation of the fault relay associated with that conductor will close the energizing circuit of only the opening relay and the blast and opening valve electromagnets of the circuit-breaker unit associated with the conductor on which the fault condition occurs. The other circuit-breaker units will remain in closed position. Closing operation of the three circuit-breaker units is initiated by the manual closing control switch MC which when closed completes an energizing circuit, through the pressure responsive switch 51, for the closing relay O. Operation of relay O completes separate energizing circuits for the closing valve electromagnets 27 of the three circuit-breaker units. The circuit for closing unit A extends from the positive line P through contacts 55a and auxiliary switch 43a, coil 27 and back through contacts 55 to negative line N. The circuit for closing unit B is from the positive line P through contacts 55b and auxiliary switch contacts 43b, coil 27 of unit B and contacts 55 to negative line N; and the circuit for closing unit C is from the positive line P through contacts 55c, auxiliary switch 43c, coil 27 of unit C and contacts 55 to negative line N. The three closing valve electromagnets are actuated to open position and admit compressed gas to the fluid motors to thereby cause closing of the contact means of the three circuit-breaker units. Relay O seals itself in through contacts 55s thereby maintaining this relay energized independently of the control switch MC and the pressure switch 51 until the closing operation is completed. Each closing valve electromagnet is automatically deenergized when the contact means of its corresponding breaker unit reach closed position by the opening of the corresponding auxiliary switch contacts 43a, 43b, and 43c. The closing relay O will be automatically deenergized as soon as the last breaker unit reaches closed position, by the energization of release relay R which disconnects relay O by opening back contacts 53. Relay R is energized upon completion of the closing operation, by the closing of the three series connected auxiliary switch contacts 39a, 39b, and 39c each of which is closed when the corresonding pole unit reaches closed position. Contacts 57 of relay R connect the coil of this relay to the manual closing control switch MC when relay R is energized. This prevents pumping of the breaker unit as in the embodiment shown in Fig. 1.

Assuming that a phase-to-ground fault occurs on the conductor controlled by the circuit-breaker unit A, operation of the fault relay 61 closes its contact 67 to close an energizing circuit from the positive conductor P through the contact 67 and pressure responsive switch 73' through conductor 85, auxiliary switch contact 41a, opening relay TA, through the parallel connected blast valve electromagnet 31 and opening valve electromagnet 23, and auxiliary switches 33a, 35a, to the negative line N, thereby causing circuit opening operation of the breaker unit A. The opening relay TA seals itself in by closing its contact TA1, thereby establishing a holding circuit for maintaining the blast valve electromagnet and opening valve electromagnet energized independently of the fault relay and also independently of the pressure responsive switch 73'. The blast valve electromagnet 31 is automatically deenergized at an intermediate point in the opening stroke by opening of the auxiliary switch 33a, and the opening valve electromagnet 23 is deenergized to cause closing of the opening valve 21 as soon as the contact 11 of the circuit-breaker unit A reaches open position, by opening of auxiliary switch contacts 35a which are arranged to open as soon as the circuit-breaker unit A reaches open position. The other two circuit-breaker units B and C are not affected and remain in closed position. As soon as the contacts of the breaker unit A have reached the desired open position, the auxiliary switch contacts 37a close, thereby completing an energizing circuit for the coil of the reclosing relay RC from the positive line P through the coil of relay RC and contacts 37a to negative line N. When relay RC picks up, the contacts thereof close an energizing circuit for the operating relay O from the positive conductor P through the contacts of relay RC, pressure responsive switch 51, closing relay O, back contacts 53 of release relay R to the negative line N. Relay O picks up and closes its contacts 55a, 55b, 55c, 55s, and 55. Contacts 55 and 55a when closed connect the closing valve electromagnet 27 of breaker unit A to the supply lines P and N, thereby energizing the electromagnet 27 to cause opening of the closing valve 25 which admits compressed air to the lower side of the piston 15 to cause reclosing of the contact means of the breaker unit A. Although the contacts 55a and 55c are closed, the closing valve electromagnets 27 of breaker units B and C are not energized because these units are in closed position, and, consequently, the auxiliary switch contacts 43b and 43c are in open position and prevent energization of the electromagnet 27 of units B and C. The closing relay O seals itself in by contact 55s, maintaining the closing relay energized independently of the reclosing relay contacts and the pressure responsive switch 51. As soon as the contacts of breaker unit A reach closed position, the release relay R is energized by the closing of auxiliary contacts 39a of breaker unit A. This energizing circuit for the relay R extends from the positive line P through the contacts 55s of closing relay O through auxiliary switches 39a, 39b, and 39c, and coil of relay R to the negative line N. Operation of the release relay R opens its back contacts 53, thereby automatically deenergizing the closing relay O. Contacts 43a in series with the closing valve electromagnet 27 of the unit A are arranged to open when the breaker unit A reaches closed position, thereby automatically deenergizing the electromagnet 27, causing the closing valve 25 of that unit to close. The closing or reclosing operation of unit A cannot be prematurely initiated because contacts TA3 of the opening relay TA remain open until the opening relay TA is deenergized upon the circuit-breaker unit A reaching open position. The contacts TA3 are in series with the closing valve electromagnet 27 so that this electromagnet cannot be deenergized until the breaker unit reaches the desired open position. Also the contacts TA2 of the opening relay TA close the energizing circuit for the release relay R as long as the opening relay is in energized condition, thereby disconnecting the closing relay by the back contacts 53 of the release relay. The contacts TA2 and TA3 of the opening relay also function respectively to close the energizing circuit for the release relay and open the circuit of the closing valve electromagnet 27 when the circuit-breaker unit A is closed or reclosed against a fault condition on the main line conductor. When the contacts of the breaker unit close or reclose against a faulted line, the fault responsive relay will be energized thereby energizing the opening relay TA. Closing of contacts TA2 completes an energizing circuit for the release relay R, thereby cutting off or disconnecting the closing relay O. At the same time, the contacts TA3 open the circuit of the closing valve electromagnet 27, thereby causing the closing valve to close. In the meantime, the blast and opening valve electromagnets 31 and 23 have been energized in response to operation of the fault relay so that the circuit-breaker unit will immediately trip open prematurely. Thus, the circuit-breaker unit is trip free, and an opening operation will always take preference over a closing operation.

If a phase-to-ground fault occurs on the center conductor of the transmission line 5, the fault responsive relay 63 will operate in response thereto and close its contacts 69 to thereby complete an energizing circuit from the positive line P through the contacts 69 of the fault relay and center pole of the pressure responsive switch 73' through conductor 37 and auxiliary switch contacts 41b of breaker unit B through the opening relay TB and the parallel circuits including the blast valve electromagnet 31 and the opening valve electromagnet 23 of the breaker unit B and the auxiliary switches 33b and 35b to the negative line N. Energization of the electromagnets 23 and 31 will cause opening of the opening valve 21 and blast valve 29 to thereby effect circuit opening operation of the breaker unit B. Opening relay TB upon being picked up seals itself in by contacts TB1 and thereby establishes a holding circuit for maintaining the blast and opening valve electromagnets energized independently of the fault responsive relay and also independently of the pressure responsive switch 73'. The blast valve closes at an intermediate point in the opening stroke by reason of opening of the auxiliary switch contacts 33b in series with the blast valve electromagnet, and the opening valve electromagnet 23 is automatically deenergized when the contact means of the breaker unit B reach open position, by the opening of the auxiliary switch contacts 35b which open upon completion of the opening operation of the unit. Breaker units A and C remain in closed position. As soon as the contacts of breaker unit B reach open position, auxiliary switch contacts 37b close, thereby energizing the reclosing relay RC to initiate the reclosing operation of breaker unit B. When relay RC picks up, it energizes the closing relay O, whereupon relay O closes its contacts completing an energizing circuit through the contacts 55 and 55b to energize the closing valve electromagnet 27 of breaker unit B. The closing valve opens and admits compressed air to effect reclosing operation of the breaker unit B. Since breaker units A and C remained in closed position, the auxiliary switch contacts 43a and 43c thereof remain in open position and hence the closing valve electromagnets of these units will not be energized by the closing relay. Relay O on energization thereof seals itself in by a holding circuit established by the contacts 55s to maintain the relay energized independently of the reclosing relay and pressure responsive switch 51. As soon as the contacts of the breaker unit B reach closed position, auxiliary contacts 39b close, thereby completing the energizing circuit for the release relay R from the positive line P through the contacts 55s and contacts 39a, 39b, and 39c and through the relay coil R to negative line N. Relay R thereupon opens its back contacts 53 to automatically deenergize the closing relay O. The contacts TB2 of opening relay TB prevent premature initiation of the reclosing operation since the relay TB remains energized until the breaker reaches open position and the contacts TB2 close the energizing circuit of the release relay R until the opening relay is deenergized, the release relay acting through the back contacts 53 to prevent energization of the closing relay O. Contacts TB2 and TB3 also provide for trip-free operation of the breaker unit B so that the breaker will be immediately tripped open if it is closed or automatically reclosed against a faulted line. As soon as the breaker closes the faulted circuit, the fault relay 63 will operate to energize the opening relay TB. Upon energization of the relay TB, the contacts TB3 open the energizing circuit of the closing valve electromagnet 27, and the contacts TB2 close the energizing circuit for the release relay R to prevent energization of the closing relay. In the meantime, the opening and blast valve electromagnets will be energized, thereby immediately causing opening operation of the breaker unit B.

If a phase-to-ground fault occurs on the conductor of the transmission line with which the fault relay 65 is associated, this relay will pick up and close its contacts 71, thereby completing an energizing circuit from the positive line P through the pole of the pressure responsive switch 73' and conductor 89, through auxiliary switch contacts 41c, opening relay TC, parallel circuits including the opening valve electromagnet 23 and blast valve electromagnet 31, and auxiliary switch contacts 33c and 35c to the negative line N. This causes energization of the opening relay TC and of the blast valve and opening valve electromagnets of the breaker unit C, thereby causing opening operation of this breaker unit. The units A and B remain in closed postion. As soon as the relay TC is energized, the contacts TC1 thereof seal in this relay and establish a holding circuit for maintaining this relay and the blast and opening valve electromagnets energized independently of the fault relay 65 and independently of the pressure responsive switch 73'. The blast valve electromagnet is automatically deenergized at an intermediate point in the opening stroke of the breaker unit by the opening of auxiliary switch contacts 33c. The opening valve electromagnet 23, however, remains energized until the breaker contacts reach open position, at which time this electromagnet is deenergized by the opening of auxiliary switch contacts 35c. As soon as the breaker unit C reaches open position, auxiliary switch contacts 37c close, thereby completing the energizing circuit for the reclosing relay RC. Operation of the relay RC closes an energizing circuit for the closing relay O which, in turn, completes an energizing circuit for the closing valve electromagnet 27 of the breaker unit C through contacts 55c and auxiliary switch contacts 43c which are closed when the breaker is opened. The closing valve electromagnets 27 of the other breaker units A and B will not be energized since the auxiliary switch contacts 43a and 43b in series therewith are in open position since these breaker units remain in closed position. Closing relay O upon energization thereof establishes a holding circuit for maintaining itself energized through the contacts 55s. When the breaker unit C reaches closed position, auxiliary switch contacts 39c close, thereby energizing the release relay R which cuts off the closing relay O by opening of the contacts 53. The opening relay TC functions to prevent premature initiation of the reclosing operation of the unit C until the contacts have reached the open position. The contacts TC2 of the relay perform this function by keeping the circuit for the release relay closed until the circuit-breaker unit C reaches open position. The contacts TC2 and TC3 of the opening relay provide for trip-free operation of the breaker unit C in the event that it is closed or automatically reclosed against the faulted line. If the fault is still present when the breaker unit C recloses the line, the opening relay TC will be immediately energized in response to operation of the fault relay 65, and the contacts TC3 of the opening relay will open the energizing circuit of the closing valve electromagnet 27 of the breaker unit C, thereby causing closing of the closing valve. The contact TC2 closes the circuit for the release relay R to thereby cause deenergization of the closing relay O. In the meantime the blast and opening valve electromagnet will be energized in response to operation of the fault relay and will cause circuit opening operation of the breaker unit C.

The three circuit-breaker units can be manually tripped open together by means of the three pole trip control switch MT'. The three sets of contacts of this switch when closed complete the three separate energizing circuits, through the pressure switches 73' and separate conductors 85, 87 and 89 for causing simultaneous energization of the opening relays and the blast and opening valve electromagnets 31 and 23 of all three breaker units A, B and C thereby causing opening operation of the three breaker units.

By the provision of the separate or independent energizing circuits for the control devices and relays for the several circuit-breaker units, flexibility of control is provided, and the system may be changed from a unison switching system to a single pole switching system or vice-versa by only relatively small changes in the control system as is evidenced by the comparison of the system shown in Figs. 1 and 2.

While the invention has been disclosed in accordance with the provisions of the patent statutes, it is to be understood that various changes may be made in the details and construction and arrangement of parts without departing from some of the essential features of the invention. It is desired, therefore, that the language of the appended claims be given the broadest reasonable construction permissible in the light of the prior art.

We claim as our invention:

1. A multipole circuit-breaker system for controlling separate conductors of a plural conductor circuit, comprising a plurality of mechanically independent sets of current interrupting contacts, one set for each pole, and an individual operating means for each set of said contacts, a control system for said plurality of units including tripping means operable to cause energization of said operating means and circuit-opening operation of all of said circuit-interrupting units substantially in unison, closing means energizable to cause said operating means to effect closing operation of the contacts of all of said circuit-interrupting units substantially in unison, and means responsive to the position of the movable contacts for deenergizing said closing means only after the contacts of all of said pole units have closed.

2. A multipole circuit-breaker system for controlling separate conductors of a plural conductor circuit, comprising a plurality of high-voltage circuit-interrupting pole units each having relatively movable current interrupting contacts and an individual operating means for said contacts, the current interrupting contacts and individual operating means of each pole unit being mechanically independent of the current interrupting contacts and operating means of the other pole units, a control system for said plurality of units including means operable to cause opening operation of said contacts, means including a closing relay operable to cause said operating means to close the contacts of all of said units that are open, and means responsive to the position of the movable contacts for deenergizing said closing relay only after the contacts of all of said pole units are closed.

3. A multipole circuit-breaker system for controlling separate conductors of a plural conductor circuit, comprising a plurality of high-voltage circuit-interrupting pole units each having relatively movable current interrupting contacts and an individual operating means for opening and closing said contacts, a control system for said plurality of units including means operable in response to predetermined abnormal conditions on any of the separate conductors to cause said operating means to effect opening operation of the contacts of all of said pole units, a closing relay operable in response to predetermined opening movement of the contacts of all of said pole units to cause said individual operating means to effect closing operation of the contacts of all of said pole units substantially in unison, and means including auxiliary switch means associated with each of said pole units for causing deenergization of said closing relay only after the contacts of all of said pole units have closed.

4. A multipole circuit-breaker system for controlling separate conductors of a plural conductor circuit, comprising a plurality of circuit-interrupting pole units, each of said units having relatively movable current interrupting contacts, an individual fluid motor for actuating said contacts, a valve for controlling operation of said motor to close said contacts and an electromagnet for controlling operation of said valve, a source of fluid under pressure connected to said plurality of valves, a control system for said plurality of pole units comprising a closing relay operable to energize said plurality of valve electromagnets to effect closing operation of the current interrupting contacts of said plurality of pole units, means responsive to the position of said movable contacts for deenergizing said closing relay only after the contacts of all of said pole units are closed, and an individual auxiliary switch associated with each of said pole units for deenergizing the valve electromagnet of its corresponding pole unit when the contacts of its pole unit are closed.

5. A multipole circuit-breaker system for controlling separate conductors of a plural conductor circuit, comprising a plurality of circuit-interrupting pole units each having relatively movable current interrupting contacts and an individual operating mechanism for opening and closing said contacts including tripping and closing means, a control system for said plurality of units comprising means operable in response to predetermined abnormal conditions on any of the separate conductors to cause tripping operation of at least the current interrupting contacts of the pole unit associated with the conductor on which the predetermined abnormal condition occurs, a single closing relay for energizing the closing means of all of said pole units that are conditioned for energization, means responsive to predetermined opening of said contacts for energizing said closing relay to cause said operating mechanism to effect reclosing operation of said contacts, means including an auxiliary switch associated with each of said pole units for deenergizing said closing relay upon completion of the closing operation of said operating mechanism, and an additional auxiliary switch associated with each of said pole units for deenergizing the closing means of its corresponding pole unit when its corresponding pole unit is in closed position.

6. A multipole circuit-breaker system for controlling separate conductors of a plural conductor circuit comprising a plurality of circuit-interrupting pole units each having relatively movable current interrupting contacts and an individual operating means for said contacts including means for closing said contacts and means for tripping open said contacts, a control system for said plurality of pole units comprising means operable in response to predetermined conditions to energize the tripping means of all of said pole units, means for maintaining each tripping means energized until the current interrupting contacts of its corresponding pole unit have opened a predetermined amount, a closing relay for simultaneously energizing the closing means of all of said pole units, and means responsive to the position of the movable current interrupting contacts for deenergizing said closing relay only after the current interrupting contacts of all of said pole units are closed.

7. A multipole circuit-breaker system for controlling separate conductors of a plural conductor circuit comprising a plurality of circuit-interrupting pole units each having relatively movable current interrupting contacts and an individual operating means for said pole units each of said operating means including means for closing said contacts and means for tripping open said contacts, a control system for said plurality of pole units comprising means operable in response to predetermined abnormal conditions on any of said separate conductors for energizing the tripping means of the pole unit associated with said conductor, means for maintaining the tripping means for each pole unit energized until the contacts of its corresponding pole unit have opened a predetermined distance, a single closing relay for energizing the closing means of any of said pole units whose contacts are in open position, means for energizing said closing relay in response to a circuit-opening operation after deenergization of said tripping means, and means responsive to the position of the movable current interrupting contacts for automatically deenergizing said closing relay upon completion of the closing operation.

8. A multipole circuit-breaker system for controlling separate conductors for a plural conductor circuit comprising a source of fluid under pressure, a plurality of circuit-interrupting pole units, each of said pole units having relatively movable current interrupting contacts, an individual fluid operating motor for said contacts, an opening valve operable to connect said source of fluid under pressure to said motor to open said contacts, and a closing valve operable to connect said source of fluid under pressure to said motor to close said contacts, each of said valves having an electromagnet for controlling operation thereof, a control system for said plurality of pole units comprising means operable in response to predetermined abnormal conditions on any of said separate conductors for energizing the opening valve electromagnet of the pole unit associated with said conductor, means for maintaining said opening valve electromagnet energized until the contacts of said pole unit have opened a predetermined amount, a single closing control relay for energizing the closing valve electromagnets of all of said pole units, means for energizing said closing control relay after said contacts have opened a predetermined amount, means for deenergizing said closing relay upon closing of said contacts, and an auxiliary switch associated with each of said pole units for deenergizing the closing valve electromagnet of its corresponding pole unit when the contacts of said pole unit are in closed position.

9. A multipole circuit-breaker system for controlling separate conductors of a plural conductor circuit comprising a plurality of circuit-interrupting pole units each having relatively movable current interrupting contacts and individual operating means for said contacts including means for closing said contacts and means for tripping open said contacts, a control system for said plurality of units including means operable in response to predetermined abnormal conditions on any of said separate conductors for causing the individual tripping means of all of said units to trip open the contacts of all of said units, means for automatically energizing the closing means of said units to reclose said contacts, and means responsive to the position of the movable contacts of each pole unit for preventing energization of the closing means of said units until the moving contacts of all of said units have opened a predetermined amount.

10. A multipole circuit-breaker system for controlling separate conductors of a plural conductor circuit comprising a plurality of mechanically independent circuit-interrupting units each having relatively movable contacts and individual operating means including means for causing closing of said contacts and means for tripping open said contacts, a control system for said plurality of units including means operable in response to predetermined conditions on any of said separate conductors for causing the tripping means of all of said units to trip open the contacts of said units, a closing relay for simultaneously energizing the closing means of all of said units, means for energizing said closing relay to cause said closing means to automatically reclose said contacts, and means responsive to the position of the movable contacts of each of said pole units for preventing energization of the closing means of said units until the moving contacts of all of said units have opened a predetermined amount.

11. A multipole circuit-breaker system for controlling separate conductors of a plural conductor circuit comprising a plurality of circuit-interrupting units each having relatively movable current interrupting contacts, an individual fluid motor for operating said contacts, an opening valve for controlling operation of said motor to open said contacts and a closing valve for controlling operation of said motor to close said contacts, said valves each having an electromagnet for controlling operation thereof, a source of fluid under pressure for operating said motors, a control system for said plurality of units comprising means responsive to predetermined fault conditions on any of said separate conductors for closing energizing circuits for the opening valve electromagnets of all of said units to effect circuit opening operation of said units, means including a seal-in relay for each opening control valve electromagnet for maintaining said electromagnet energized until the contacts of the corresponding unit have opened a predetermined amount, a closing relay for closing energizing circuits for the closing control valve electromagnets of all of said units, means for energizing said closing relay to cause reclosing of the contacts of all of said units, and means responsive to the operation of said seal-in relays for preventing energization of any of the closing control valve electromagnets to close said contacts until the moving contacts of all of said units have opened a predetermined amount.

12. A multipole circuit-breaker system for controlling separate conductors of a plural conductor circuit comprising a plurality of mechanically independent circuit-interrupting units, each of said units having relatively movable contacts, an individual fluid motor for operating said contacts, a closing valve for controlling operation of said motor to close said contacts and an opening valve for controlling operation of said motor to open said contacts, each of said valves having an electromagnet for controlling operation thereof, a source of fluid under pressure for operating said motors, a control system for said plurality of units comprising energizing circuits for said valve electromagnets, means responsive to predetermined abnormal conditions on any of said separate conductors for closing the energizing circuits for all of said opening valve electromagnets to effect circuit opening operation of all of said units, means for maintaining each opening control valve electromagnet energized until the moving contact of its corresponding pole unit has opened a predetermined amount, a single closing relay for closing the energizing circuits of all of said closing valve electromagnets to effect circuit closing operation of said plurality of pole units, circuit means for energizing said closing relay to effect reclosing operation of the contacts of said pole units, and means for preventing energization of said closing relay until the moving contacts of all of said pole units have opened a predetermined amount.

13. A multipole circuit-breaker system for controlling separate conductors of a plural conductor circuit comprising a plurality of circuit-interrupting units, each of said units having relatively movable current interrupting contacts, an individual fluid motor for operating said contacts, a closing valve for controlling operation of said motor to close said contacts and an opening valve for controlling operation of said motor to open said contacts, each of said valves having an electromagnet for controlling operation thereof, a source of fluid under pressure for operating said motors, a control system for said plurality of units comprising energizing circuits for said valve electromagnets, means responsive to predetermined abnormal conditions on any of said separate conductors for closing the energizing circuit of the opening valve electromagnet of the corresponding pole unit to effect circuit opening operation of said units, means for maintaining each opening control valve electromagnet energized until the moving contact of its corresponding pole unit has opened a predetermined amount, a single closing relay for closing the energizing circuits of all of said closing valve electromagnets to effect circuit closing operation of said plurality of pole units, circuit means for energizing said closing relay to effect reclosing operation of the contacts of said pole units, and means operable to open the energizing circuit of said closing relay when any one of said opening valve electromagnets is energized.

14. A multipole circuit-breaker system for controlling separate conductors of a plural conductor circuit comprising a plurality of circuit-interrupting units, each of said units having relatively movable current interrupting contacts, an individual fluid motor for operating said contacts, a closing valve for controlling operation of said motor to close said contacts and an opening valve for controlling operation of said motor to open said contacts, each of said valves having an electromagnet for controlling operation thereof, a source of fluid under pressure for operating said motors, a control system for said plurality of units comprising energizing circuits for said valve electromagnets, means responsive to the predetermined abnormal conditions on any of said separate conductors for closing the energizing circuit of at least the opening valve electromagnet of the corresponding pole unit to effect circuit opening operation of said unit, means for maintaining each opening control valve electromagnet energized until the moving contact of its corresponding pole unit has opened a predetermined amount, a single closing relay for closing the energizing circuits of all of said closing control valve electromagnets to effect circuit closing operation of any and all pole units that are open, circuit means for energizing said closing relay to effect reclosing operation of the contacts of said pole units, and means operable to prevent energization of the electromagnets of said closing control valves when any one of said opening control valve electromagnets is in energized condition.

15. A multipole circuit-breaker system for controlling separate conductors of a plural conductor circuit comprising a plurality of circuit-interrupting pole units, each of said units having relatively movable arcing contacts, a fluid motor for operating said contacts, an opening valve for controlling operation of said motor to open said contacts and a closing valve for controlling operation of said motor to close said contacts, each of said valves having an electromagnet for controlling operation thereof, a source of fluid under pressure for operating said motors, a control system for said plurality of units comprising energizing circuits for the electromagnets of said valves, fault-responsive means associated with each of said separate conductors for closing the energizing circuit of the opening valve electromagnet of the corresponding pole unit, a relay of the seal-in type in the energizing circuit of each opening valve electromagnet for maintaining said electromagnet energized independently of said fault-responsive means until the contacts of the corresponding pole unit have opened a predetermined amount, a single closing relay for closing the energizing circuits of the closing valve electromagnets, the energizing circuit of each closing control valve electromagnet including an auxiliary switch which opens said energizing circuit when the contacts of the corresponding pole unit have closed and also including a pair of contacts operable by the seal-in relay of the corresponding pole unit to open said energizing circuit when the seal-in relay is energized.

16. A multipole circuit-breaker system for controlling separate conductors of a plural conductor circuit comprising a plurality of circuit-interrupting pole units each having relatively movable arcing contacts and an individual operating means including closing means adapted to be energized to close said contacts and opening means adapted to be energized to cause opening of said contacts, a control system for said plurality of units comprising energizing circuits for the opening means and the closing means of said units, means responsive to predetermined abnormal conditions on any of said separate conductors for closing the energizing circuit of the opening means of the corresponding pole unit, a relay of the seal-in type associated with the energizing circuit of each of said opening means for maintaining said opening means energized until the contacts of its pole have opened a predetermined amount, a single closing relay means for closing the energizing circuits of the closing means of all of said pole units to effect closing of said contacts, the energizing circuit of each closing means including an auxiliary switch arranged to open said circuit when the contacts of the corresponding pole unit are closed and also including a pair of contacts opened by the seal-in relay of the corresponding pole unit when said seal-in relay is energized.

17. A multipole circuit-breaker system for controlling separate conductors of a plural conductor circuit comprising a plurality of mechanically independent pole units each having relatively movable contacts for controlling a corresponding one of said conductors and an individual operating means including closing means adapted to be energized to cause closing of said contacts and opening means adapted to be energized to cause opening of said contacts, a control system for said plurality of units comprising energizing circuits for the closing means and the opening means of all of said units, means responsive to predetermined abnormal conditions on any of said separate conductors for closing the energizing circuits of the opening means of all of said units, a relay of the seal-in type associated with the energizing circuit of each of said opening means and energized therewith for maintaining said opening means energized until the contacts of its pole unit have opened a predetermined amount, a single closing relay for closing the energizing circuits of the closing means of all of said units to effect closing of said contacts, an energizing circuit for said closing relay, the energizing circuit of each closing means including an auxiliary switch which opens said circuit when the contacts of the corresponding pole unit are closed, and means operable to automatically open the energizing circuit of said closing relay when any one of said plurality of seal-in relays is energized.

18. A multipole circuit-breaker system for controlling separate conductors of a plural conductor circuit comprising a plurality of circuit-interrupting pole units each having relatively movable arcing contacts for controlling a corresponding one of said conductors and an individual operating means including opening means adapted to be energized to cause opening of said contacts and closing means adapted to be energized to cause closing of said contacts, a control system for said plurality of units comprising energizing circuits for the closing means and the opening means of said units, means operable in response to predetermined abnormal conditions on any of said separate conductors for closing the energizing circuit of the opening means of at least the corresponding pole unit, means responsive to energization of each opening means for maintaining said opening means energized until the contacts of the corresponding pole unit have opened a predetermined amount, a closing relay for closing the energizing circuits of the closing means of all of said units, an energizing circuit for said closing relay, the energizing circuit of each closing means including an auxiliary switch which opens said energizing circuit when the contacts of the corresponding pole unit are closed, and means operable to prevent energization of any of said closing means when any of said opening means is energized.

19. A multipole circuit-breaker system for controlling separate conductors of a plural conductor circuit comprising a plurality of circuit-interrupting pole units each having relatively movable arcing contacts for controlling a corresponding one of said conductors and an individual operating means for said contacts including opening means adapted to be energized to cause opening of said contacts and closing means adapted to be energized to cause closing of said contacts, a control system for said plurality of units comprising energizing circuits for the closing means and the opening means of said units, means operable in response to predetermined abnormal conditions on any of said separate conductors for closing the energizing circuit of the opening means of the corresponding pole unit, means responsive to energization of each opening means for maintaining said opening means energized until the contacts of the corresponding pole unit have opened a predetermined amount, a closing relay for closing the energizing circuits of the closing means of all of said units, an energizing circuit for said closing relay, the energizing circuit of each closing means including an auxiliary switch which opens said energizing circuit when the contacts of the corresponding pole unit are closed, and means operable to automatically open the energizing circuit of said closing relay when any of said opening means is in energized condition.

20. A multipole circuit-breaker system for controlling separate conductors of a plural conductor circuit comprising a plurality of mechanically independent circuit-interrupting pole units, each of said units having relatively movable contacts, a fluid motor for operating said contacts and an opening valve for controlling operation of said motor to open said contacts, each of said valves having an electromagnet for controlling operation thereof, a source of fluid under pressure for operating said motors, a control system for said plurality of pole units comprising energizing circuit for said valve electromagnets, means responsive to predetermined conditions on any of said separate conductors for closing an energizing circuit for the opening valve electromagnet of the corresponding pole unit, switch means responsive to the pressure of said source for preventing energization of any of said opening valve electromagnets in response to operation of said predetermined condition responsive means when the pressure of said source is below a predetermined value, and means responsive to energization of each opening valve electromagnet for maintaining said opening valve electromagnet energized independently of said condition-responsive means and said pressure-responsive switch means until the contacts of the corresponding pole unit have opened a predetermined amount.

21. A multipole circuit-breaker system for controlling separate conductors of a plural conductor circuit comprising a plurality of mechanically independent circuit-interrupting pole units, each of said units having relatively movable contacts, a fluid motor for operating said contacts and an opening valve for controlling operation of said motor to open said contacts, each of said valves having an electromagnet for controlling operation thereof, a source of fluid under pressure for operating said motors, a control system for said plurality of pole units comprising energizing circuits for said valve electromagnets, control means for closing the energizing circuits for the opening valve electromagnets, switch means responsive to the pressure of said source of fluid pressure for preventing energization of any of said opening valve electromagnets in response to operation of said control means when the pressure of said source is below a predetermined value, and means responsive to energization of each opening valve electromagnet for maintaining said opening valve electromagnet energized independently of said control means and said pressure-responsive switch means until the contacts of the corresponding pole unit have opened a predetermined amount.

22. A multipole circuit-breaker system for controlling separate conductors of a plural conductor circuit comprising a plurality of pole units, each of said units having relatively movable arcing contacts, an individual fluid motor for operating said contacts, an opening valve for controlling operation of said motor to open said contacts and a closing valve for controlling operation of said motor to close said contacts, each of said valves having an electromagnet for controlling operation thereof, a source of fluid under pressure for operating said motors, a control system for said plurality of units comprising energizing circuits for said valve electromagnets, means responsive to predetermined conditions on any of said separate conductors for closing an energizing circuit of the opening valve electromagnet of the corresponding pole unit, a closing relay for closing the energizing circuit of all of said closing valve electromagnets, the energizing circuit of each closing valve electromagnet having an auxiliary switch therein arranged to open the energizing circuit when the contacts of the corresponding pole unit are closed, pressure-responsive switch means responsive to the pressure of said source for preventing energization of any of said valve electromagnets when the pressure of said source is below a predetermined value, means responsive to energization of each opening valve electromagnet for maintaining the opening valve electromagnet energized independently of said predetermined condition-responsive means and said pressure-responsive switch means until the contacts of the corresponding pole unit have opened a predetermined amount, and means responsive to energization of said closing relay for maintaining said relay energized independently of said pressure-responsive switch means until the contacts of said pole units are closed.

23. A multipole circuit-breaker system for controlling separate conductors of a plural conductor circuit comprising a plurality of circuit interrupting pole units each having relatively movable arcing contacts and an individual operating means for said contacts including means for closing said contacts and means for tripping open said contacts, a control system for said plurality of pole units comprising means operable in response to predetermined conditions on any of said separate conductors for energizing the tripping means of only the pole unit on which the predetermined condition occurs, means for maintaining each tripping means energized until the contacts of its corresponding pole unit have opened a predetermined amount, means including a closing relay for energizing the closing means of any pole unit whose contacts are open, and means including individual auxiliary switches associated with each of said pole units for causing deenergization of said closing relay upon completion of the closing operation of the contacts being closed.

24. A multipole circuit-breaker system for controlling separate conductors of a plural conductor circuit comprising a plurality of mechanically independent circuit interrupting pole units, each of said units having relatively movable contacts, a fluid motor for operating said contacts, an opening valve for controlling operation of said motor to open said contacts and a closing valve for controlling operation of said motor to close said contacts, each of said valves having an electromagnet for controlling operation thereof, a source of fluid under pressure for operating said motors, a control system for said plurality of units comprising independently controllable energizing circuits for said valve electromagnets, means operable in response to predetermined fault conditions on any of said separate conductors for closing the energizing circuit of the opening valve electromagnet of only the pole unit associated with the conductor on which the predetermined fault condition occurs, means responsive to energization of each opening valve electromagnet for maintaining said electromagnet energized until the contacts of the corresponding pole unit have opened a predetermined amount, means including a single closing relay for closing the energizing circuits of said closing valve electromagnet of any pole unit whose contacts are open, and means including an individual auxiliary switch associated with each of said pole units for automatically causing said closing relay to be deenergized upon completion of the closing operation of the contacts that are being closed.

25. A multiple circuit-breaker system for controlling separate conductors of a plural conductor circuit comprising a plurality of circuit interrupting pole units each having relatively movable arcing contacts and an individual operating means for said contacts including closing means adapted to be energized to close said contacts and opening means adapted to be energized to cause opening of said contacts, a control system for said plurality of units comprising independently controllable energizing circuits for the opening means and for the closing means of said units, means responsive to predetermined fault conditions on any of said separate conductors for closing the energizing circuit of only the opening means of the pole unit associated with the conductor on which the predetermined fault condition occurs, a relay of the seal-in type associated with the energizing circuit of each of said opening means for maintaining said opening means energized until the contacts of its pole unit have opened a predetermined amount, means including a single closing relay for closing the energizing circuits of the closing means of all of said pole units to effect closing of said contacts, the energizing circuit of each closing means including an auxiliary switch arranged to open said circuit when the contacts of the corresponding pole unit are closed and also including a pair of contacts opened by the seal-in relay of the corresponding pole unit when said seal-in relay is energized.

26. A multipole circuit-breaker system for controlling separate conductors of a plural conductor circuit comprising a plurality of mechanically independent circuit interrupting pole units, each of said units having relatively movable contacts, a fluid motor for operating said contacts and an opening valve for controlling operation of said motor to open said contacts, each of said valves having an electromagnet for controlling operation thereof, a source of fluid under pressure for operating said motors, a control system for said plurality of pole units comprising independently controllable energizing circuits for said valve electromagnets, means responsive to predetermined fault conditions on any of said separate conductors for closing the energizing circuits of all of said opening valve electromagnets, switch means responsive to the pressure of said source for preventing energization of any of said opening valve electromagnets in response to operation of said predetermined condition responsive means when the pressure of said source is below a predetermined value, and means responsive to energization of each opening valve electromagnet for maintaining said opening valve electromagnet energized independently of said condition responsive means and said pressure responsive switch means until the contacts of the corresponding pole unit have opened a predetermined amount.

HOWARD M. WILCOX.
JACK E. SCHRAMECK.
HERBERT J. WEBB.

REFERENCES CITED

The following references are of record in the file of this patent:

UNITED STATES PATENTS

| Number | Name | Date |
|---|---|---|
| 2,213,658 | Thourmen | Sept. 3, 1940 |
| 2,287,041 | Journeaux | June 23, 1942 |
| 2,327,493 | Bresson | Aug. 24, 1943 |
| 2,340,095 | Wilcox | Jan. 24, 1944 |